US012733596B2

(12) United States Patent
Lee

(10) Patent No.: US 12,733,596 B2
(45) Date of Patent: Sep. 15, 2026

(54) PLANT CULTIVATION APPARATUS

(71) Applicant: LG ELECTRONICS INC., Seoul (KR)

(72) Inventor: Bongkook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 551 days.

(21) Appl. No.: 18/034,532

(22) PCT Filed: Oct. 28, 2021

(86) PCT No.: PCT/KR2021/015339

§ 371 (c)(1),
(2) Date: Apr. 28, 2023

(87) PCT Pub. No.: WO2022/092866

PCT Pub. Date: May 5, 2022

(65) Prior Publication Data

US 2023/0380352 A1 Nov. 30, 2023

(30) Foreign Application Priority Data

Oct. 28, 2020 (KR) ........................ 10-2020-0141595

(51) Int. Cl.
*A01G 9/24* (2006.01)
*A01G 9/029* (2018.01)

(52) U.S. Cl.
CPC ........... *A01G 9/247* (2013.01); *A01G 9/0297* (2018.02)

(58) Field of Classification Search
None
See application file for complete search history.

(56) References Cited

U.S. PATENT DOCUMENTS 2,188,880 A * 1/1940 Albert .................... A01G 31/02 47/61
4,474,212 A 10/1984 Schmitz
(Continued)

FOREIGN PATENT DOCUMENTS

CN 111247997 6/2020
CN 111567279 8/2020
(Continued)

OTHER PUBLICATIONS

Korean Notice of Allowance dated Apr. 14, 2023 issued in Application No. 10-2020-0141595.
(Continued)

*Primary Examiner* — Magdalena Topolski
*Assistant Examiner* — Edgar Reyes
(74) *Attorney, Agent, or Firm* — KED & ASSOCIATES, LLP

(57) ABSTRACT

The present invention relates to a plant cultivation apparatus comprising: a cabinet having a cultivation space; cultivation shelves which can be inserted into or withdrawn from the cabinet, and on which plants to be cultivated are loaded; drain ports opened to drain water supplied to the cultivation shelves; an opening/closing member for opening/closing the drain port; and a driving device which is provided in the cultivation space, and which selectively comes in contact with the opening/closing member to operate the opening/closing member, wherein the driving device can include: a driving motor; a pinion, which is rotated by means of the driving motor and has a pinion gear; a rod which has a rack gear coupled to the pinion gear, and which vertically moves by means of the pinion to open/close the opening/closing member; and a case for forming the exterior thereof and guiding the movement of the rod.

20 Claims, 15 Drawing Sheets

(56) References Cited

U.S. PATENT DOCUMENTS

| | | | | |
|---|---|---|---|---|
| 2015/0342133 | A1* | 12/2015 | Nakajima | A01G 31/06 47/62 R |
| 2016/0106115 | A1* | 4/2016 | Wu | A01G 31/02 47/62 N |
| 2016/0178265 | A1* | 6/2016 | Lee | F04D 25/08 417/423.15 |
| 2017/0094920 | A1* | 4/2017 | Ellins | A01H 4/001 |
| 2019/0183062 | A1* | 6/2019 | Pham | A01G 31/06 |
| 2020/0221646 | A1* | 7/2020 | Bacolas | A01G 27/003 |
| 2021/0144942 | A1* | 5/2021 | Ofir | A01G 7/045 |

FOREIGN PATENT DOCUMENTS

| | | | | | |
|---|---|---|---|---|---|
| JP | 2012-110285 | | | 6/2012 | |
| KR | 10-0234081 | | | 1/2000 | |
| KR | 10-2013-0098091 | | | 9/2013 | |
| KR | 10-2016-0095424 | | | 8/2016 | |
| KR | 10-2018-0005344 | | | 1/2018 | |
| KR | 10-1954251 | | | 3/2019 | |
| KR | 10-2019-0057809 | | | 5/2019 | |
| KR | 20200100496 | A | * | 8/2020 | A01G 31/008 |
| WO | WO 2018/021219 | | | 5/2019 | |

OTHER PUBLICATIONS

Extended European Search Report dated Aug. 27, 2024 issued in Application No. 21886860.2.

International Search Report dated Feb. 3, 2022 issued in Application No. PCT/KR2021/015339.

* cited by examiner

PLANT CULTIVATION APPARATUS

CROSS-REFERENCE TO RELATED PATENT APPLICATIONS

This application is a U.S. National Stage Application under 35 U.S.C. § 371 of PCT Application No. PCT/KR2021/015339, filed Oct. 28, 2021, which claims priority to Korean Patent Application No. 10-2020-0141595, filed Oct. 28, 2020, whose entire disclosures are hereby incorporated by reference.

TECHNICAL FIELD

The present disclosure relates to a plant cultivation apparatus.

BACKGROUND ART

A general plant cultivation apparatus forms a predetermined cultivation chamber having an environment suitable for the growth of plants, and stores the plants inside the predetermined cultivation chamber. The plant cultivation apparatus is provided with a configuration for supplying nutrients and light energy necessary for plant growth, and plants grow by the supplied nutrients and light energy.

In recent years, a plant cultivation apparatus has been developed that includes a cultivation space capable of adjusting light, temperature, and moisture, and a door that opens and closes the cultivation space so that plants can be directly cultivated indoors at home.

In Korean Patent Registration No. 10-1954251, a plant cultivator is disclosed which has a tray in which capsules containing seeds are seated inside a case forming a cultivation space that is opened and closed by a door and can adjust light, moisture, and temperature, respectively, by a light source module, a culture medium module, and an air conditioning module. In addition, in order to supply water to the plants placed in the capsule, the plant cultivator has a structure in which a culture medium spraying unit is provided inside the tray to supply the culture medium to the capsule.

However, in the prior art of such a structure, the culture medium may remain at the bottom of the tray due to the frequent supply of the culture medium of the spraying unit, and effective drainage work of the culture medium inside the tray is not accompanied, so mold or algae are generated in the tray, and thus there is a problem that the cultivation space may be contaminated and an odor may be generated.

DISCLOSURE

Technical Problem

An object of the present disclosure is to provide a plant cultivation apparatus capable of effective water supply and drainage to a cultivation shelf disposed to be drawn in and out.

An object of the present disclosure is to provide a plant cultivation apparatus in which drainage performance of a cultivation shelf is improved.

An object of the present disclosure is to provide a plant cultivation apparatus capable of preventing contamination of a cultivation space through effective drainage in a cultivation shelf.

Technical Solution

A plant cultivation apparatus according to an embodiment of the present disclosure may include cabinets in which growing spaces are formed; a cultivation shelf provided to be drawn in and out of the cabinet and on which plants for cultivation are seated; a drain hole opened to drain water supplied to the cultivation shelf; an opening and closing member opening and closing the drain hole; and a driving device provided inside the cultivation space and selectively in contact with the opening and closing member to operate the opening and closing member; in which the driving device may include a driving motor; a pinion rotated by the driving motor and having a pinion gear; a rod having a rack gear coupled to the pinion gear and moving up and down by the pinion to open and close the opening and closing member; and a case for forming an outer appearance and guiding the movement of the rod.

The case may include a guide extending in a vertical direction along one surface and recessed on an inner surface of the case to guide movement of the rod.

The case may include a rod insertion portion through which a portion of an upper surface is opened and through which the rod passes.

The case may include a through-portion through which a portion of the lower surface is opened and through which the rod passes.

The driving device may further include a bracket for supporting the pinion with one side recessed.

The case may include a mounting portion which is formed protruding from the inner surface of the case and to which the bracket is mounted.

The mounting portion may include a boss into which a fastening member penetrating the bracket is inserted.

The mounting portion may include an edge portion protruding from the inner surface of the case, and a rounded portion formed in a rounded shape on one side of the edge portion and in contact with the pinion.

The case may include a side cutout formed by cutting a portion of the side surface.

The case may include a fastening portion protruding from one surface and having a fastening hole through which a fastening member passes.

The bracket may include a through-groove on one side of which is recessed and through which the pinion passes.

The bracket may include a mounting hole which is disposed above or below the through-groove, and through which a fastening member passes and is coupled to the mounting portion.

The bracket may include a reinforcement portion extending upward from the upper surface.

The bracket may include, on one side coupled to the driving motor, a motor fixing hole through which a fastening member passes through and is coupled to the driving motor.

The rod may include a body in which a rack gear is formed; and a pressing portion extending downward from a lower end of the body and in contact with the opening and closing member.

The size of the lower surface of the body may be formed larger than the size of the lower surface of the pressing portion.

The body may include a guide rib extending along one surface in a vertical direction and protruding.

The driving device may be disposed above the cultivation shelf and be provided at the rear of the cultivation space.

Advantageous Effect

Plant cultivation apparatus according to an embodiment of the present disclosure can expect the following effects.

In the plant cultivation apparatus according to an embodiment of the present disclosure, the opening and closing member maintains a closed state in a state where water is supplied to the cultivation shelf. In addition, after the water supply is completed, the opening and closing member is opened by the driving device to drain the water from the cultivation shelf. Therefore, except for the time when water is supplied to the cultivation shelf, the water inside the cultivation shelf can be emptied to prevent mold or algae from growing inside the cultivation space and to maintain a clean environment.

A guide for guiding the movement of the rod is formed on one surface of the case forming the outer appearance of the driving device. In addition, a guide rib inserted into the guide is formed on one side of the rod. Therefore, there is an advantage in that the rod can be more stably mounted in the case and does not deviate from the set moving direction of the rod.

In addition, a mounting portion on which a bracket coupled to the driving motor is mounted while supporting the pinion is provided on one surface of the case. The mounting portion is screwed to the bracket, so that the driving motor and the pinion can be maintained more firmly mounted inside the case.

In addition, a side cutout a portion of which is cut is provided on a surface of the case. The side cutout has an advantage of securing a wider working space when combined with the rod in a state where the driving motor, the bracket, and the pinion are mounted inside the case in a provisionally assembled state.

In addition, openings through which the rods are drawn in and out are provided on the upper and lower surfaces of the case. Therefore, the rod can be inserted into the case from the top of the case and there is an advantage of providing a space in which the rod can move in a vertical direction.

In addition, the driving device according to an embodiment of the present disclosure includes a bracket supporting the pinion. The bracket includes a through groove through which the pinion passes, a mounting hole coupled to the mounting portion, and a motor fixing hole screwed to the driving motor. Accordingly, there is an advantage in that the pinion and the driving motor can be more firmly mounted inside the case by the bracket.

BEST MODE

Hereinafter, specific embodiments of the present disclosure will be described in detail with drawings. However, the present disclosure cannot be said to be limited to the embodiments in which the spirit of the present disclosure is presented, and other degenerative inventions or other embodiments included in the scope of the present disclosure can be easily suggested by adding, changing, or deleting other components.

Define direction before description. In an embodiment of the present disclosure described below, unless a separate direction is defined, the direction of the front of the door illustrated in FIG. 1 may be defined as forward, the direction toward the cabinet based on the front of the door may be defined as backward, the direction toward the floor where the plant cultivation apparatus is installed may be defined as downward, and the direction away from the floor may be defined as upward.

Figure 1:
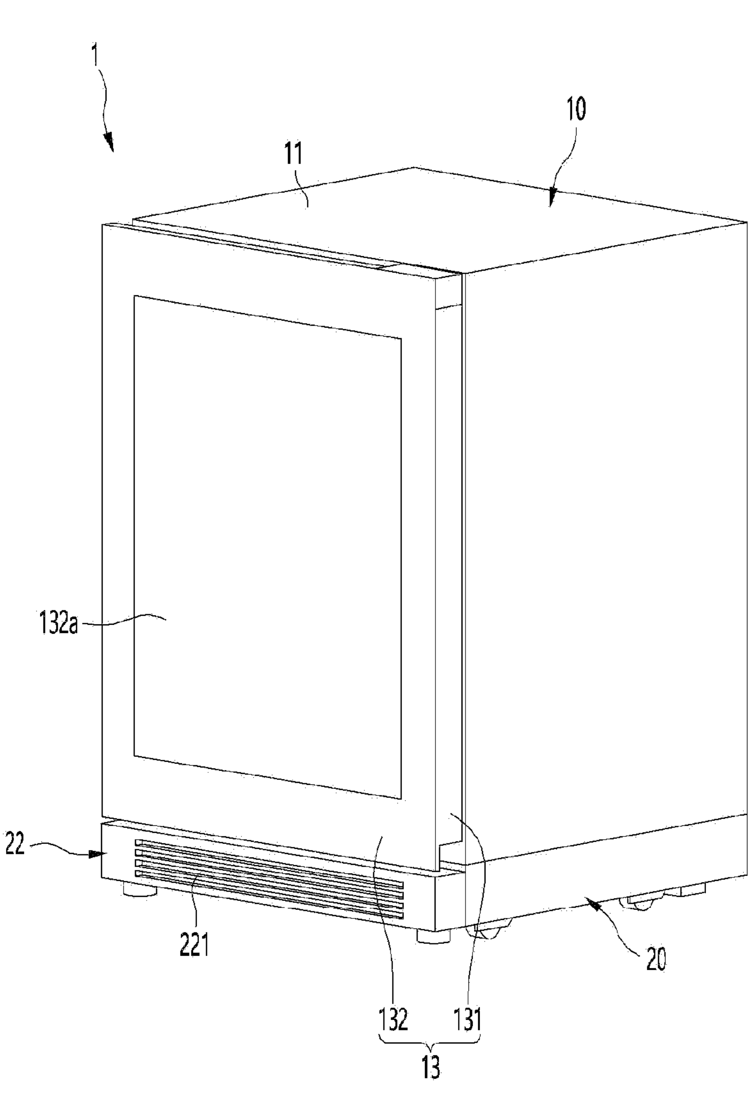
FIG. 1 is a perspective view illustrating a plant cultivation apparatus according to an embodiment of the present disclosure.
Figure 2:
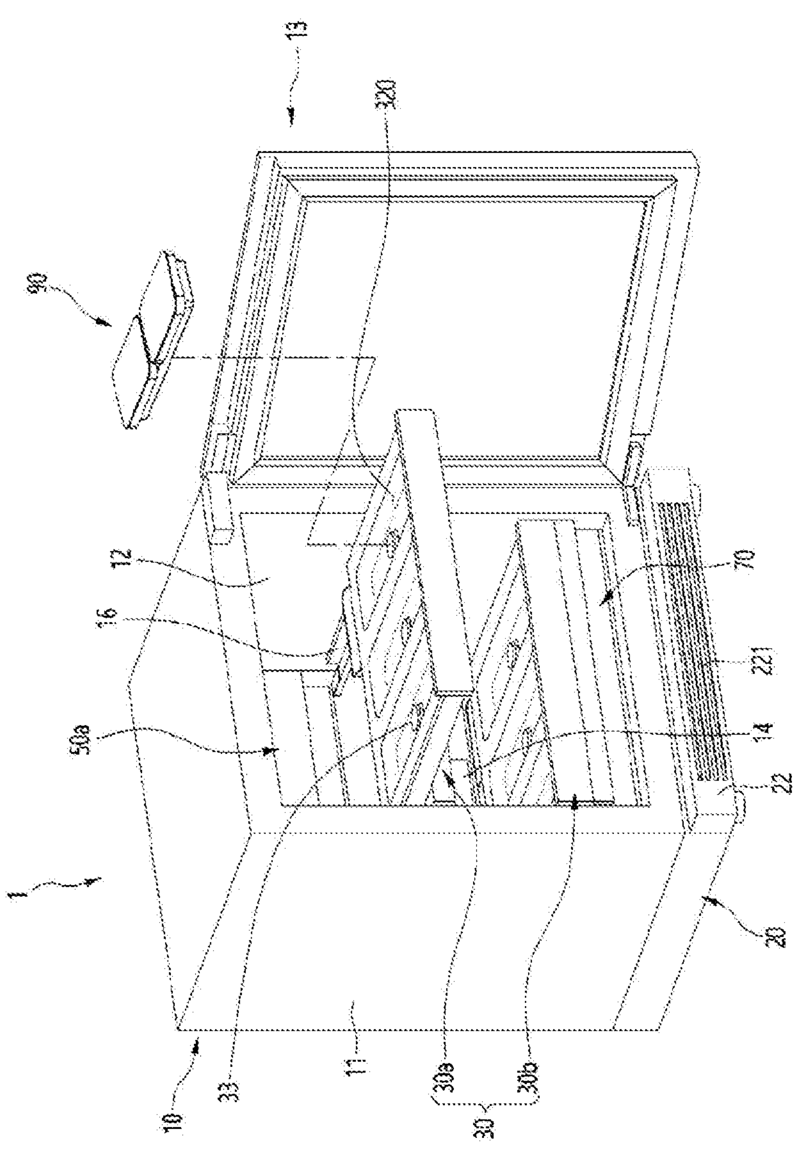
FIG. 2 is a perspective view illustrating a state where the door of the plant cultivation apparatus is opened.
Figure 3:
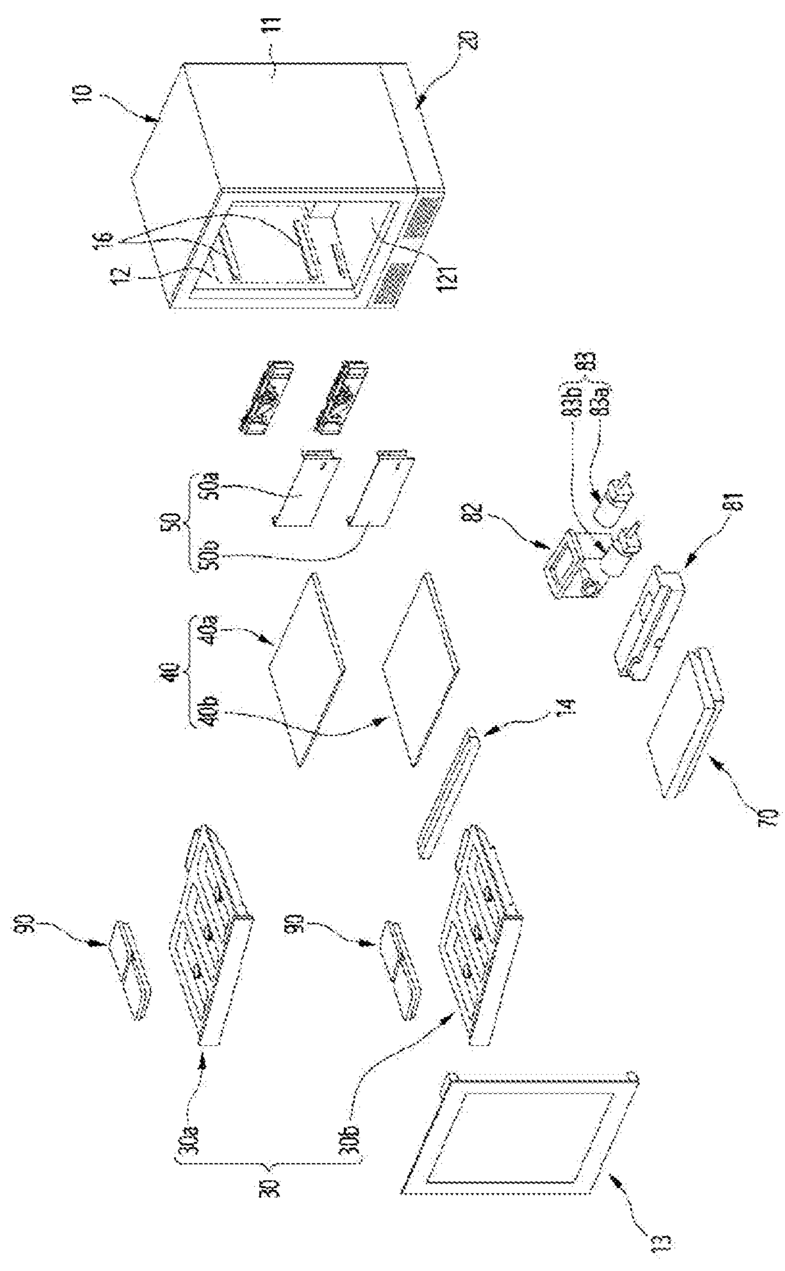
FIG. 3 is an exploded perspective view illustrating the plant cultivation apparatus.

FIG. 1 is a perspective view illustrating a plant cultivation apparatus according to an embodiment of the present disclosure, FIG. 2 is a perspective view illustrating a state where the door of the plant cultivation apparatus is opened, and FIG. 3 is an exploded perspective view illustrating the plant cultivation apparatus.

As illustrated in the drawing, an outer appearance of the plant cultivation apparatus 1 according to an embodiment of the present disclosure may be formed by a cabinet 10 forming a space in which plants are cultivated, and a door 13 opening and closing the cabinet 10.

The cabinet 10 may be composed of an outer case 11 forming an outer appearance and an inner case 12 forming the cultivation space 100, and a heat insulation material may be provided between the outer case 11 and the inner case 12 to insulate the cultivation space 100.

A door 13 opening and closing the cultivation space 100 is provided on the front surface of the cabinet 10. A seeing through-portion 132*a* capable of seeing through the inside of the cultivation space 100 may be provided on the front surface of the door 13.

Meanwhile, a machine room 20 may be provided below the cabinet 10. A number of components including a compressor and a condenser constituting a refrigerating cycle may be disposed in the machine room 20. In addition, a front cover 22 may be formed on the front surface of the machine room 20. The front cover 22 may have a structure in which a grill portion 221 having a plurality of openings is formed so that air for cooling and heat dissipation inside the machine room 20 can be introduced and discharged forward.

Inside the cabinet 10, a plurality of cultivation shelves 40 may be disposed vertically. The cultivation shelf 40 may include an upper cultivation shelf 40*a* and a lower cultivation shelf 40*b*, but is not limited thereto, and two or more cultivation shelf 40 may be provided depending on the size of the cabinet 10.

In addition, the cultivation shelf 40 may be configured to be drawn in and out in the front and rear direction from the inside of the cabinet 10. In addition, the cultivation shelf 40 may have a structure in which a plurality of seed packages 30 are seated.

For example, a plurality of seating portions 420 recessed in a shape corresponding to the seed package 30 may be formed on the upper surface of the cultivation shelf 40, and a seed package 30 desired by the user may be seated on the seating portion 420 and thus plants can be cultivated.

In addition, water may be supplied to the cultivation shelf 40 from the water tank 70, and the water supplied to the cultivation shelf 40 may be selectively supplied to the seating portion 420 in which the seed package 30 is disposed among the plurality of seating portions 420.

In addition, the cultivation space 100 may include a display 14 displaying an operating state of the plant cultivation apparatus 1.

Meanwhile, the internal temperature of the cultivation space 100 may be adjusted by a refrigeration cycle. In detail, an evaporator 243 may be provided on the rear wall of the cultivation space 100, and a blower 50 may be provided in front of the evaporator. In addition, a heater 18 is provided on one side wall of the cultivation space 100 so that the entire cultivation space 100 can be evenly cooled or heated.

A lighting device 40 may be provided above the cultivation shelf 30. The lighting device 40 may be provided with a number corresponding to the number of the cultivation shelves 30. For example, the lighting device 40 may include an upper lighting device 40*a* and a lower lighting device 40*b* provided in a lower space.

The water tank 70 may be provided on a bottom surface inside the cabinet 10. The water tank 70 may store water supplied to the cultivation shelf 30 and water recovered from the cultivation shelf 30. The water tank 70 may be disposed below the lower cultivation shelf 40*b* to be drawn in and out.

A pump cover 81 may be provided in a rear space covered by the water tank 70. Inside the pump cover 81, a pump 83 for supplying water from the water tank 70 to the cultivation shelf and a sub tank 82 provided between the water tank 70 and the pump 83 may be further provided.

For example, the pump 83 may include an upper pump 83*a* supplying water to the upper cultivation shelf 30*a* and a lower pump 83*b* supplying water to the lower cultivation shelf 30*b*.

Figure 4:
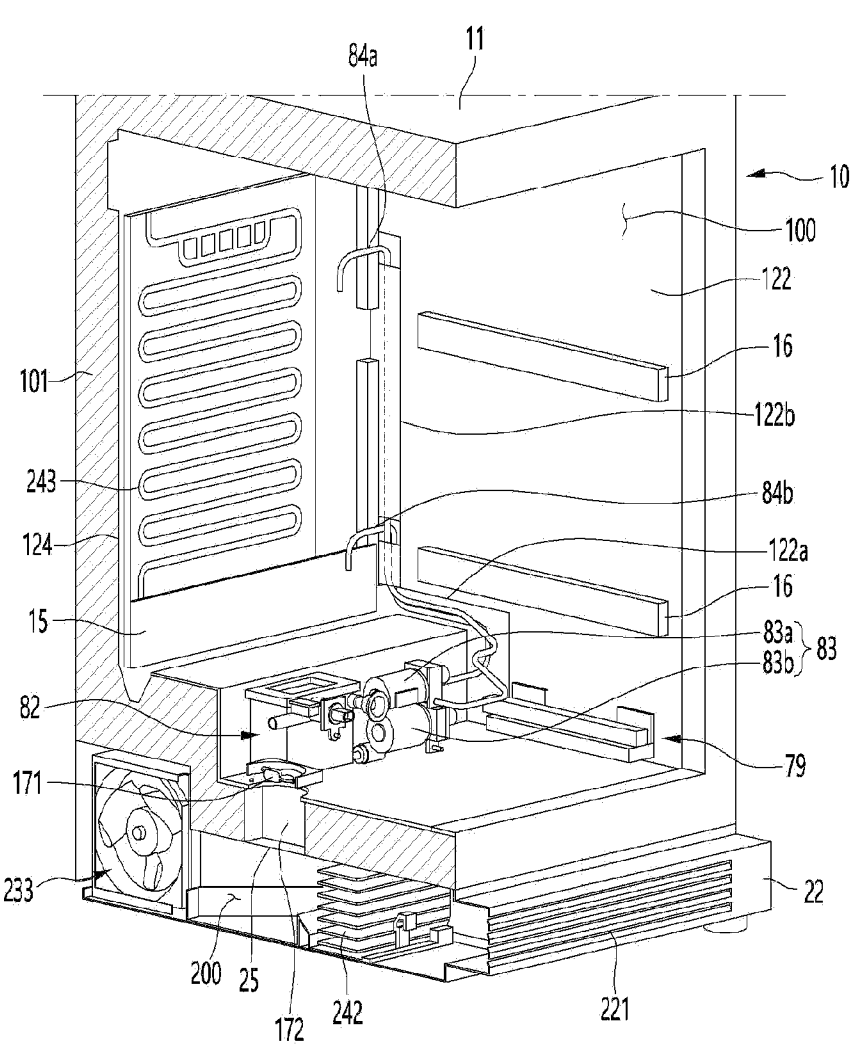
FIG. 4 is a cutaway perspective view illustrating the disposition of a water supply module inside a cabinet according to an embodiment of the present disclosure.
Figure 5:
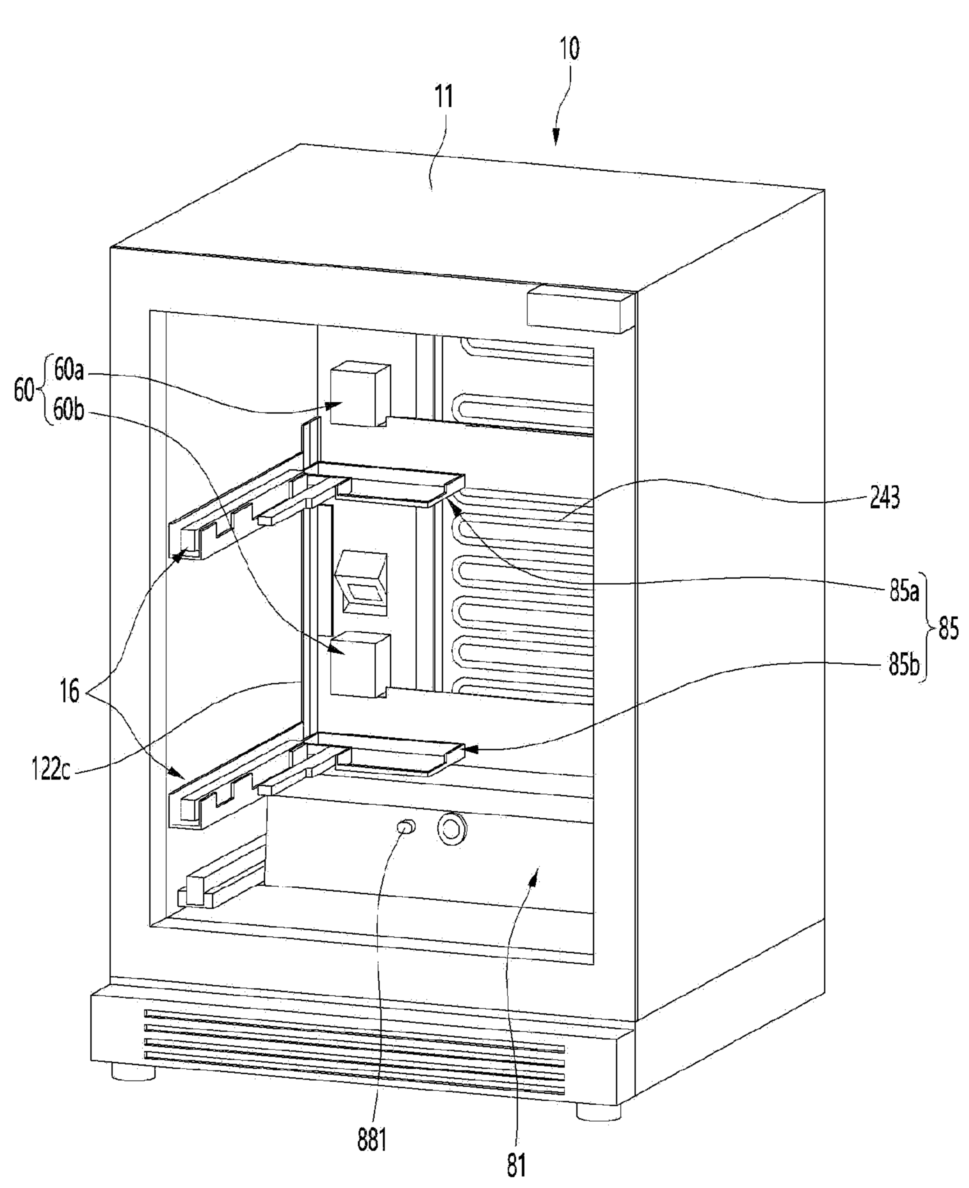
FIG. 5 is a perspective view illustrating the disposition of a drain module inside a cabinet according to an embodiment of the present disclosure.

FIG. 4 is a cutaway perspective view illustrating the disposition of a water supply module inside a cabinet according to an embodiment of the present disclosure, and FIG. 5 is a perspective view illustrating the disposition of a drain module inside a cabinet according to an embodiment of the present disclosure.

As illustrated in the drawing, the cabinet 10 forms the cultivation space 100 by the inner case 12. The inner case 12 may include a bottom plate 121 forming the bottom of the cultivation space 100, a pair of side plates 122 forming both sides thereof in the left and right direction, a top plate 123 forming an upper surface thereof, and a back plate 124 forming a rear surface thereof.

The bottom plate 121 is formed in a stepped shape with a higher rear half portion, so that an installation space for the compressor 241 can be secured inside the machine room 200.

In addition, the sub tank 82 and the pump 83 may be disposed on the front half portion of the bottom plate 121, which has a relatively lower height than the rear half portion and may be shielded by the pump cover 81.

The side plate 122 may be provided with shelf rails 16 extendable in multiple stages and may be combined with the shelf rails 16 provided on both sides of the cultivation shelf 30. Therefore, the cultivation shelf 30 can be drawn in and out in the front and rear direction.

A water supply pipe guide 122*a* may be formed in the side plate 122 on the right side of the side plate 122 to accommodate the water supply pipe 84 therein. In addition, a guide cover 122*b* for shielding a portion of the open front surface of the water supply pipe guide 122*a* is formed to shield the water supply pipe 84 accommodated therein from being exposed to the outside.

The water supply pipe 84 may include the upper water supply pipe 84*a* connected to the upper pump 83*a* to supply water to the upper cultivation shelf 30*a* and a lower water supply pipe 84*b* connected to the lower pump 83*b* to supply water to the lower cultivation shelf 30*b*.

It may be called a water supply module including the sub tank 82, the pump 83, and the water supply pipe 84 disposed to supply water to the cultivation shelf 30, and the water supply module may be provided on the inner space of the pump cover 81 and the side wall of the cultivation space 100 not to be exposed to the outside in a normal use state.

Meanwhile, as illustrated in FIG. 5, a drain module may be disposed on the other side facing the one side of the cultivation space 100 where the water supply module is disposed.

In detail, among the left and right sides forming the cultivation space 100, a drain pipe 89 may be disposed on one side facing the other side where the water supply pipe 84 is disposed. In addition, a drain tray 85 may be provided at a corner region adjacent to the rear surface of the cultivation space 100 adjacent to the drain pipe 89.

A drain pipe guide 122*c* recessed inward may be formed on the side plate 122 forming the left side of the cultivation space 100.

The drain pipe 89 extends in the vertical direction and allows all of the water drained from the upper cultivation shelf 30*a* and the lower cultivation shelf 30*b* to be drained through the single drain pipe 89.

The drain pipe 89 guides the water in the drain tray 85 to the water tank and may include a drain guide pipe 87 connected to the drain tray 85 and a drain tube 88 connecting the drain guide pipe 87 to the water tank 70.

In addition, the drain pipe 89 is connected to the drain tray 85 in a state of being disposed inside the drain pipe guide 122*c* to guide the water drained from the cultivation shelf 30 to the inside of the pump cover 81.

The drain tray 85 is disposed below the cultivation shelf 30 and is disposed adjacent to the rear wall of the cultivation space 100 so that the drain tray is not exposed to the outside.

Meanwhile, the drain valve 881 connected to the end portion of the drain pipe 89 may be connected to the drain tube 88 disposed inside the pump cover 81.

The drain valve 881 is exposed forward and is connected to the water tank 70 and opened when the water tank 70 is drawn in and is separated from the water tank 70 and closed when the water tank 70 is drawn out.

Figure 6:
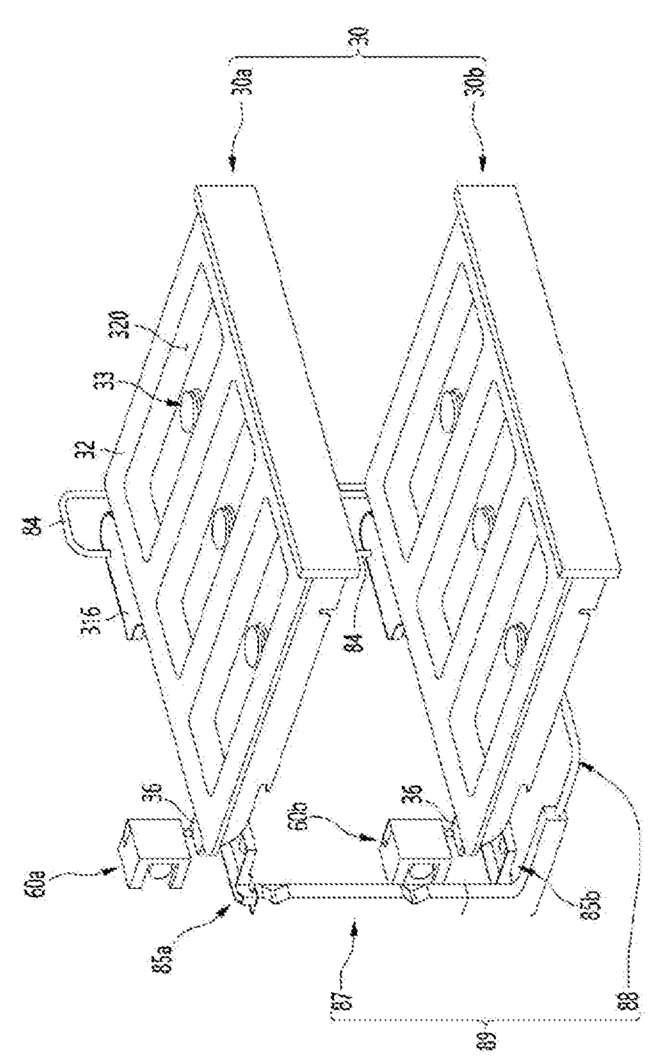
FIG. 6 is a perspective view illustrating a cultivation shelf and a water supply and drain module, which are components of the plant cultivation apparatus.
Figure 7:
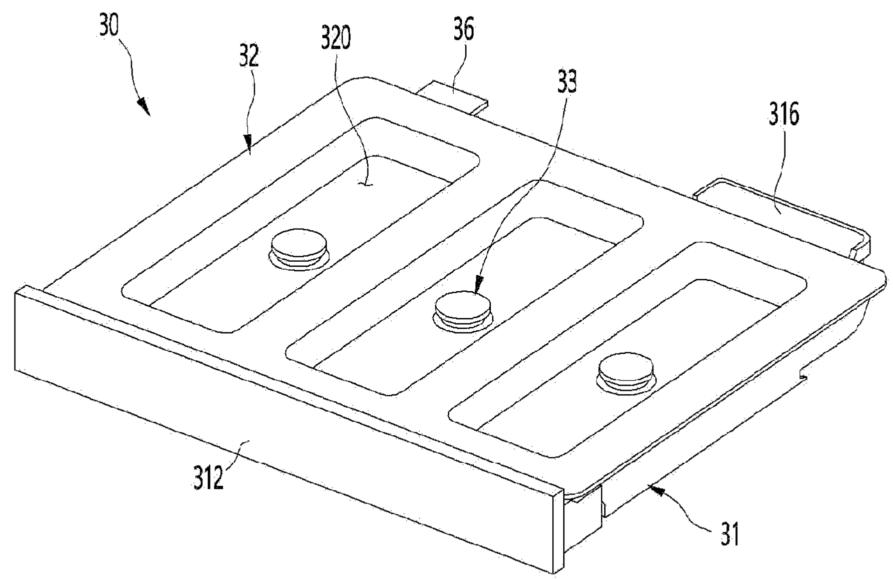
FIG. 7 is a perspective view illustrating the cultivation shelf.
Figure 8:
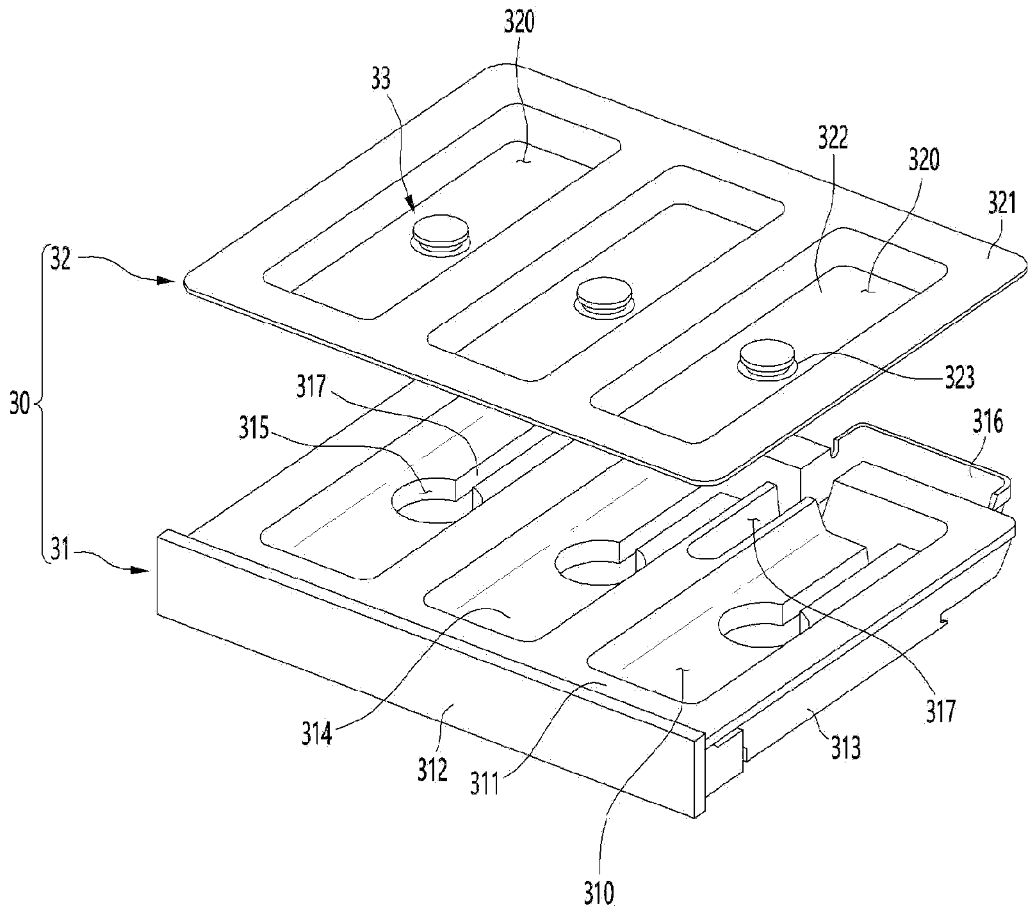
FIG. 8 is an exploded perspective view illustrating the cultivation shelf.

FIG. 6 is a perspective view illustrating a cultivation shelf and a water supply and drain module, which are components of the plant cultivation apparatus, FIG. 7 is a perspective view illustrating the cultivation shelf, and FIG. 8 is an exploded perspective view illustrating the cultivation shelf.

As illustrated in the drawing, a plurality of cultivation shelves 30 may be disposed vertically, and may include, for example, an upper cultivation shelf 30*a* disposed upward and a lower cultivation shelf 30*b* disposed downward.

In addition, the water supply module and the drain module disposed on both sides of the cultivation shelf 30 in the left and right direction may be connected to the water tank 70. Therefore, while water is circulated between the water tank 70 and the cultivation shelf 30, water and nutrients in an appropriate amount can be supplied to the seed package 90 at the right time.

The water supply module may be located on the side where the water supply portion 316 is formed based on the cultivation shelf 30.

The pump 83 can adjust the amount of water supplied to the cultivation shelf 30 through control. For example, the pump can be operated 8 times a day, In other words, at intervals of 3 hours, and make sure that about 1 liter of water can be supplied at one time of water supply.

The drain module may be located on one side where the opening and closing member (or cover) 36 is provided based on the cultivation shelf 30. The drain module may include a drain tray 85 and a drainage pipe 89. The drain tray 85 is disposed below the opening and closing member 36 that opens and closes the drain hole 319*a* of the cultivation shelf 30 and is formed to receive the water of the cultivation shelf 30 drained from the drain hole 319*a*.

The opening and closing member 36 is formed to open and close the drain hole 319*a* by rotation and may be operated by a driving device 60 provided above the opening and closing member 36.

The driving device 60 may include an upper driving device 60*a* for opening the opening and closing member 36 of the upper cultivation shelf 30*a* and a lower driving device 60*b* for opening the opening and closing member 36 of the lower cultivation shelf 30*b*.

For example, the driving device 60 has a structure in which the rod 65 is moved up and down by a motor drive, and when moved downward, the drain hole 319*a* can be opened by pressing and rotating the opening and closing member 36. In addition, when the rod 65 moves upward, the opening and closing member 36 returns to the original position thereof and shields the drain hole 319*a* again.

In other words, the water of the cultivation shelf 30 may be drained by the operation of the driving device 60. The driving device 60 may be operated after a set time elapses after water is supplied to the cultivation shelf 30. Therefore, the water supplied to the cultivation shelf 30 is drained after a set time that can be sufficiently supplied to the seed package 90 has elapsed so that no water remains in the cultivation shelf 30 to maintain a clean state.

The drain tray 85 may be connected to the drain pipe 89. The drain tray 85 may include an upper drain tray 85*a* provided below the upper cultivation shelf 30*a* and a lower drain tray 85*b* provided below the lower cultivation shelf 30*b*.

In addition, the drain tray 85 may primarily accommodate the water discharged from the cultivation shelf 30 and guide the water discharged from the cultivation shelf 30 toward the drain pipe 89 without overflowing.

In this way, the water supply module and the drain module are connected to the water tank 70 to supply water from the water tank 70 to the cultivation shelf 30 or to return water from the cultivation shelf 30 to the water tank 70.

Meanwhile, the cultivation shelf 30 is configured to allow a plurality of seed packages 90 to be seated and may have a structure in which water supplied from the water tank 70 is supplied to the seed packages 90.

In detail, the cultivation shelf 30 may include a shelf tray 32 on which the seed packages 90 are seated, and a shelf base 31 accommodating water supplied to the seed packages 90.

The shelf tray 32 may be mounted on the upper surface of the shelf base 31 in an overlapping state, and the front surface and both sides of the shelf base 31 in the left and right direction may be exposed in a state where the shelf tray 32 is mounted. The water supply portion 316 and the opening and closing member 36 on the rear side of the shelf base 31 may also protrude from the rear side of the shelf tray 32.

The shelf tray 32 may include a tray upper surface 321 forming the overall outer appearance of the upper surface and a seating portion 320 recessed in the tray upper surface 321.

The seating portion 320 may be recessed into a shape corresponding to the seed package 90 so that the seed package 90 may be seated thereon.

In addition, a shutter 33 may be provided at the center of the bottom surface 322 of the seating portion. The shutter 33 may be provided one by one for each of the plurality of seating portions 320. In addition, the shutter 33 may be mounted on a plate mounting hole 323 penetrating the bottom surface 322 of the seating portion. The shutter 33 may selectively allow water contained in the shelf base 31 to flow in by moving up and down. Since the shutter enables selective water supply to the seating portion 320, the shutter may also be referred to as a water supply member.

Meanwhile, the shelf base 31 may be provided below the shelf tray 32. The shelf base 31 allows water supplied from the water tank 70 to flow and be stored, and may have an upper surface shape corresponding to a lower surface shape of the shelf tray 32 so that the shelf tray 32 can be seated thereon.

Inside the shelf base 31, there is a shutter accommodation portion 315 in which the shutter 33 is accommodated, and a base flow path 317 connecting the shutter accommodation portion 315, the water supply portion 316, and the drain hole 319*a*, and an opening and closing member 36 opening and closing the drain hole 319*a*.

In addition, a handle 312 for drawing in and out of the cultivation shelf 30 is formed on the front surface of the shelf base 31, and a base side 313 coupled with shelf rails 16 for drawing in and out of the cultivation shelf 30 may be formed on both sides of the shelf base 31 in the left and right direction.

Meanwhile, a water supply portion 316 may be formed at one side of the rear end of the shelf base 31. The water supply portion 316 may protrude rearward and is recessed to receive water supplied through the water supply pipe 84.

In addition, a drain hole 319*a* and an opening and closing member 36 opening and closing the drain hole 319*a* may be provided at the other side of the rear end of the shelf base 31. The opening and closing member 36 has a shape capable of covering and shielding the drain hole 319*a* and an area adjacent to the drain hole 319*a*, and has a structure which protrudes backward and is rotated according to the operation of the driving device 60 to be capable of opening and closing the drain hole 319*a*.

Hereinafter, the structure of the opening and closing member 36 will be described in more detail with reference to the drawings.

Figure 9:
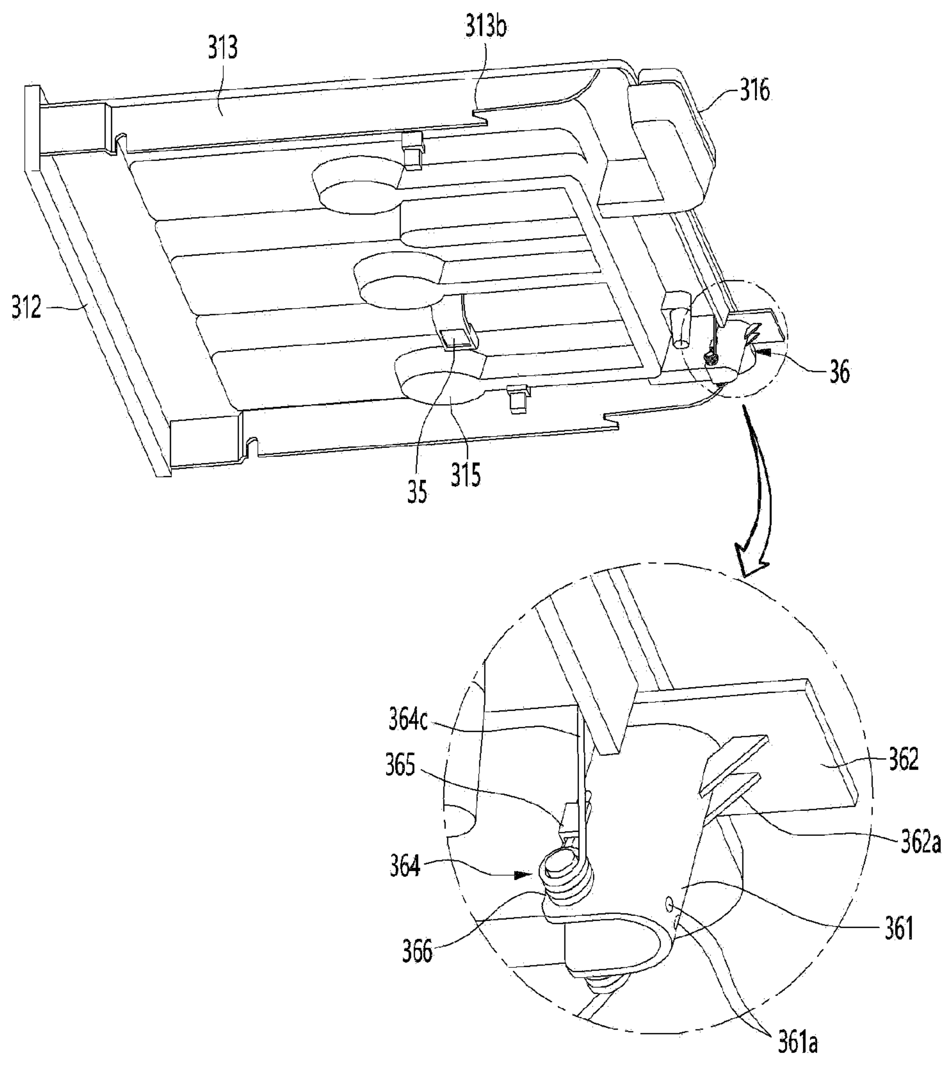
FIG. 9 is a perspective view illustrating a shelf base, which is one component of the cultivation shelf, viewed from below.
Figure 10:
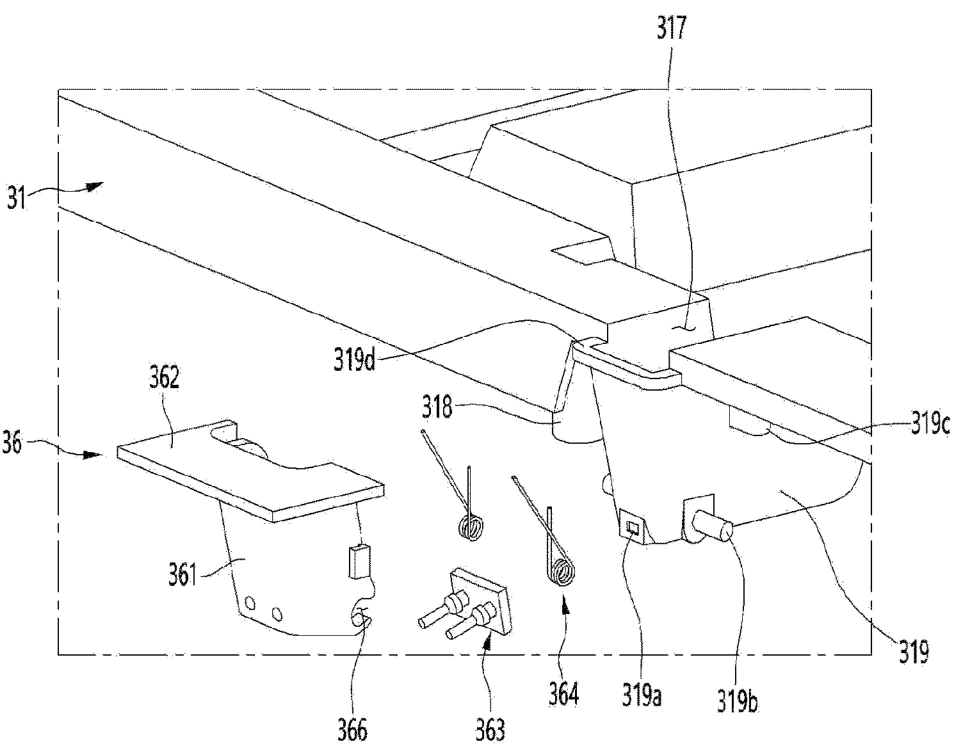
FIG. 10 is an exploded perspective view illustrating a coupling structure of an opening and closing member according to an embodiment of the present disclosure.

FIG. 9 is a perspective view illustrating a shelf base, which is one component of the cultivation shelf, viewed from below, and FIG. 10 is an exploded perspective view illustrating a coupling structure of an opening and closing member according to an embodiment of the present disclosure.

As illustrated, a shelf drain holed wall 319 protruding backward and downward may be provided at the rear end of the shelf base 31. The shelf drain holed wall 319 may protrude toward the drain tray 85, and the lower rear surface of the shelf drain holed wall 319 may be positioned above the drain tray 85.

In addition, the drain hole 319*a* may be formed at the lower end of the rear surface of the shelf drain holed wall 319.

In addition, opening and closing member rotation shafts 319*b* protruding outward may be formed on both sides of the shelf drain holed wall 319 in the left and right direction. The opening and closing member rotation shaft 319*b* may be coupled to the shaft coupling portion 366 of the opening and closing member 36.

The opening and closing member 36 may be provided at a rear surface of the shelf drain holed wall 319. The opening and closing member 36 may be formed to surround the shelf drain holed wall 319 from the rear, and may be formed to open and close the drain hole 319*a* by rotation.

In detail, the opening and closing member 36 may include an opening and closing body 361 that surrounds the shelf drain holed wall 319 from the rear and a rotation manipulation portion 362 pressed by the driving device 60.

The opening and closing body 361 may form a recessed space 360 to accommodate portions of the rear surface and both side surfaces of the shelf drain holed wall 319 and may be formed to surround a region adjacent to the drain hole 319*a* including the drain hole 319*a*.

A sealing member 363 made of an elastic material such as rubber or urethane may be provided on an inner surface of the opening and closing body 361. The sealing member 363 seals the gap between the opening and closing member 36 and the shelf drain holed wall 319 so that water does not drain through the drain hole 319*a* in a state where the opening and closing member 36 is closed.

In addition, the elastic member 364 may be mounted on the opening and closing member rotation shaft 319*b*. In addition, a first fixing portion 319*c* supported by one end of the elastic member 364 may be formed on upper portions of both side surfaces of the shelf drain holed wall 319. For example, the elastic member 364 may have a structure such as a torsion spring, so that the opening and closing member 36 is restored to an initial state where the drain hole 319*a* is shielded.

Meanwhile, the rotation manipulation portion 362 is provided at an upper end of the opening and closing body 361. The rotation manipulation portion 362 may extend rearward to be in contact with the rod 65 of the driving device 60. The rotation manipulation portion 362 may be in contact with the rod 65 and thus rotate around the opening and closing member rotation shaft 319*b*.

Meanwhile, a driving device 60 for selective rotation of the opening and closing member 36 may be provided inside the cultivation space 100.

Hereinafter, the structure of the driving device 60 will be described in more detail with reference to the drawings.

Figure 11:
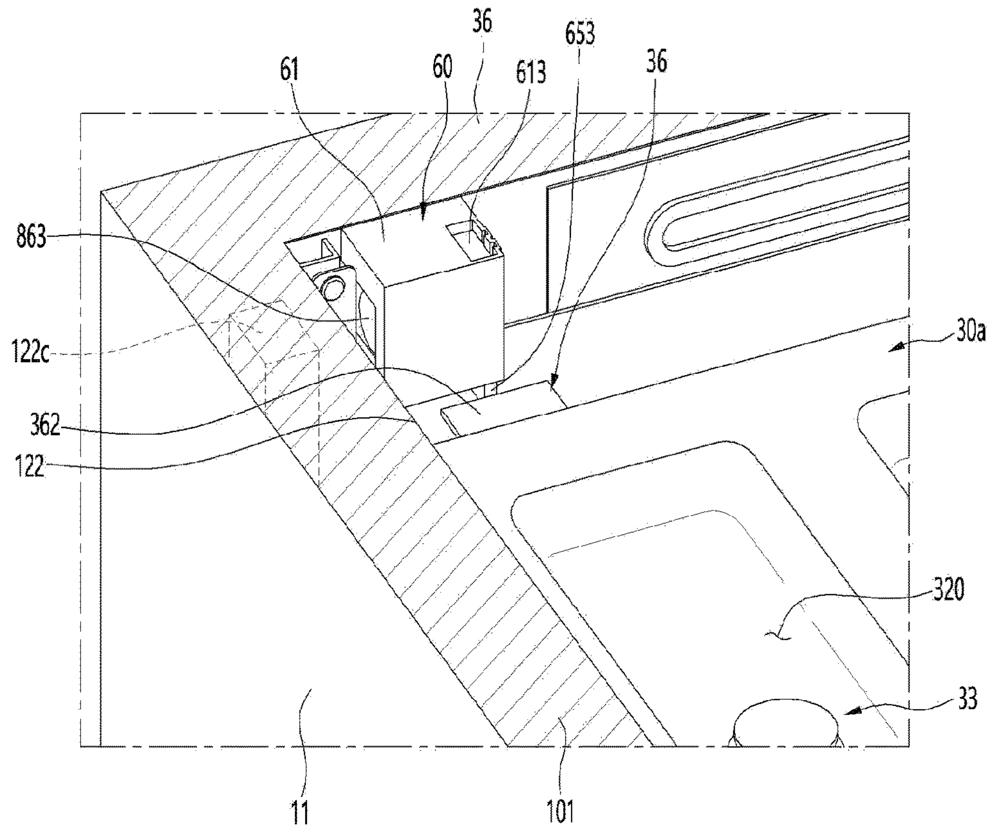
FIG. 11 is a cutaway perspective view illustrating the disposition of a driving device, an opening and closing member, and a cultivation shelf according to an embodiment of the present disclosure.
Figure 12:
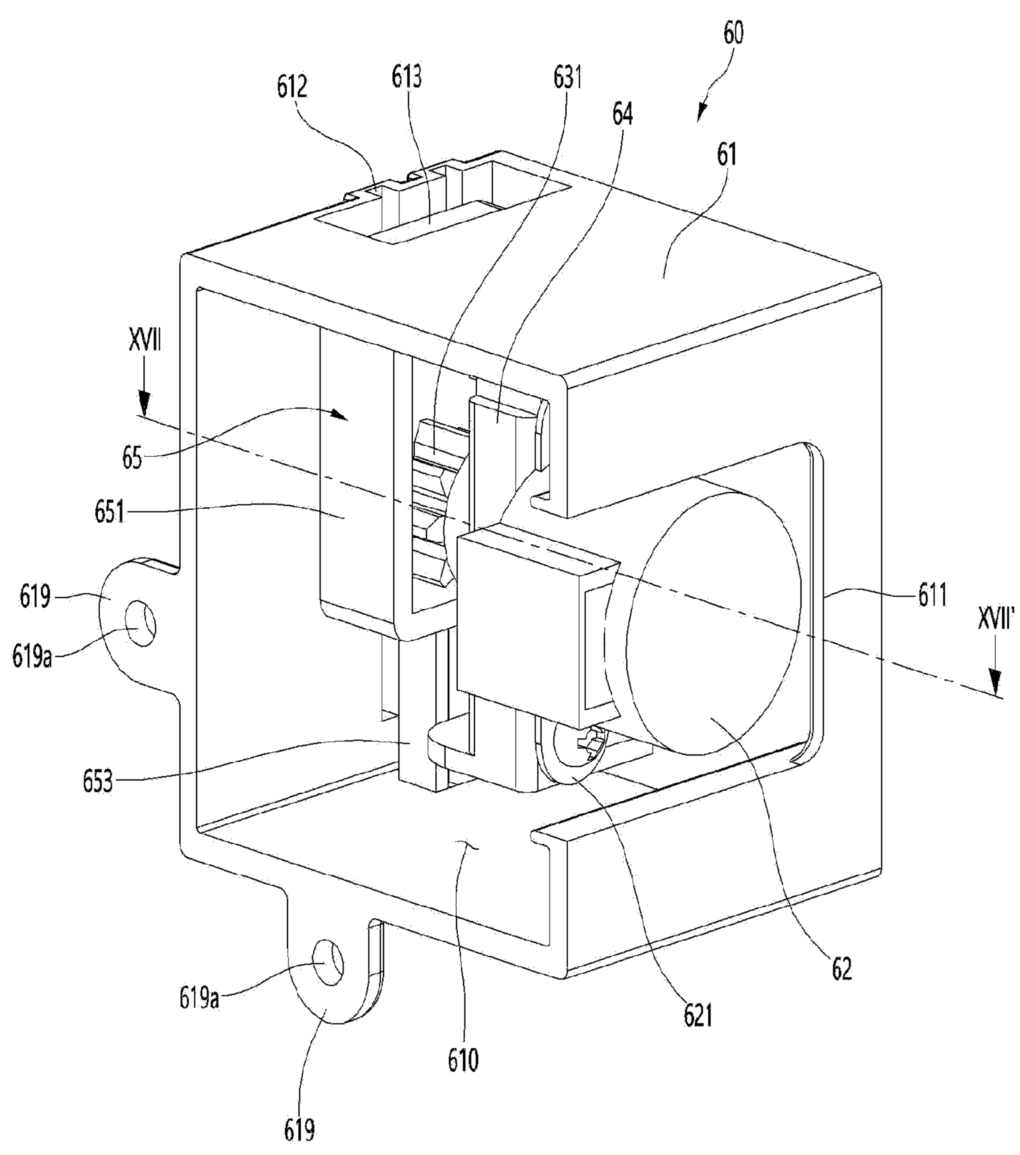
FIG. 12 is a perspective view illustrating the inside of the driving device.
Figure 13:
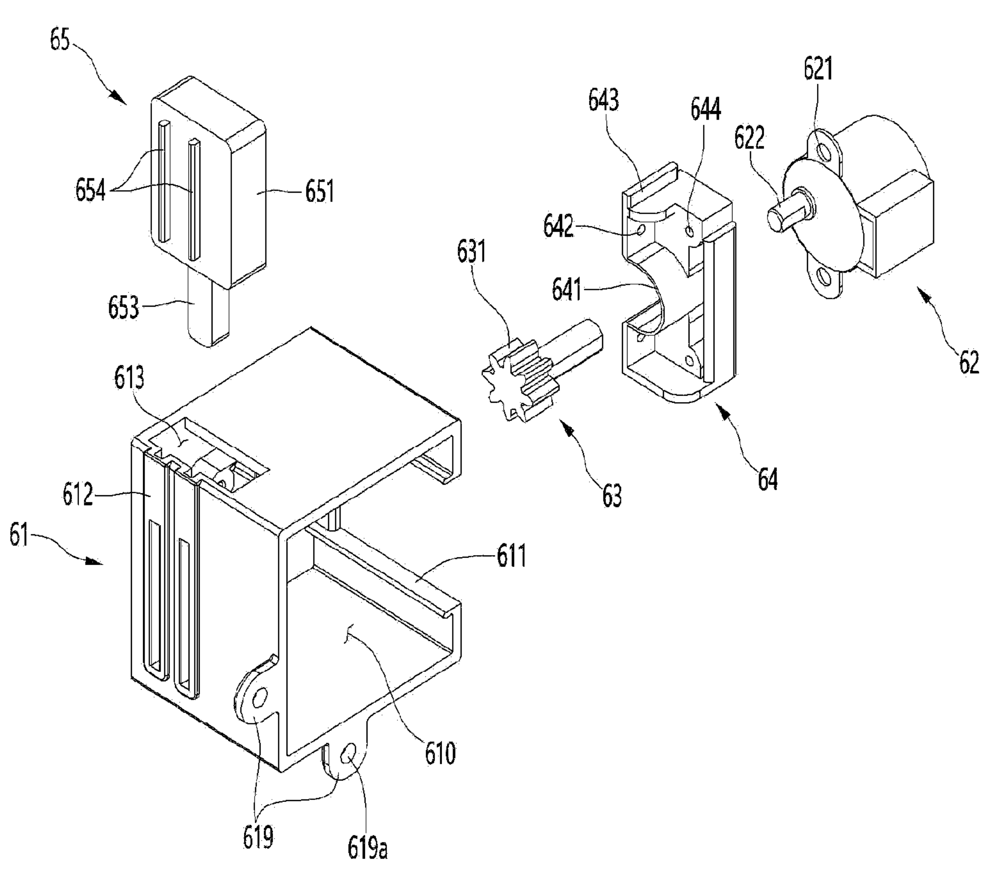
FIG. 13 is an exploded perspective view illustrating the coupling structure of the driving device from one direction.
Figure 14:
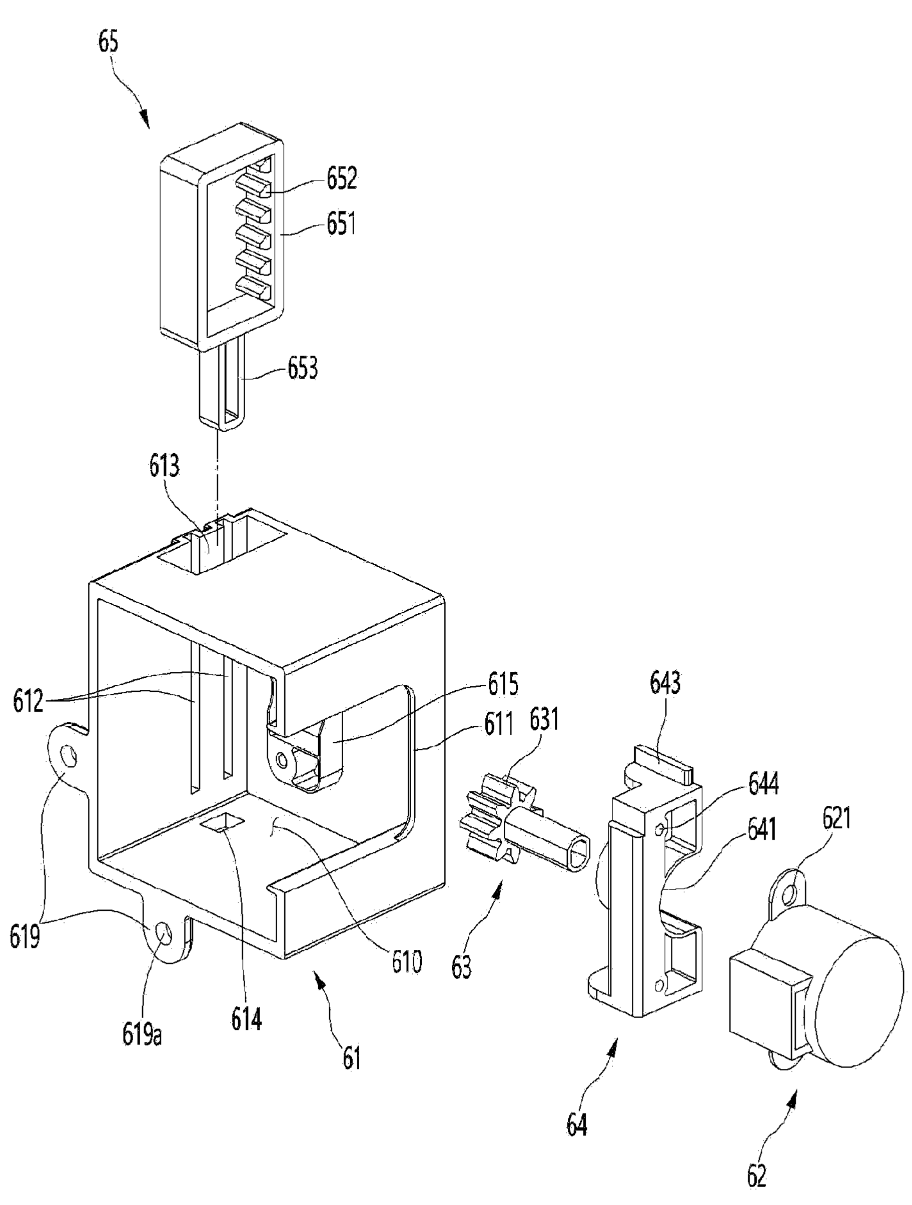
FIG. 14 is an exploded perspective view illustrating the coupling structure of the driving device from another direction.

FIG. 11 is a cutaway perspective view illustrating the disposition of a driving device, an opening and closing member, and a cultivation shelf according to an embodiment of the present disclosure, FIG. 12 is a perspective view illustrating the inside of the driving device, FIG. 13 is an exploded perspective view illustrating the coupling structure of the driving device from one direction, and FIG. 14 is an exploded perspective view illustrating the coupling structure of the driving device from another direction.

The driving device 60 is provided to determine the drainage of the cultivation shelf 30 by rotating the opening and closing member 36. The driving device may be disposed at the corners of the side and rear surfaces of the cultivation space 100. In addition, since the driving device 60 is covered in a state where the blower 50 is mounted, the driving device may not be exposed to the front of the cultivation space 100.

The driving device 60 is located above each of the cultivation shelves 30 and may be disposed vertically above the opening and closing member 36. For example, the driving device 60 may include an upper driving device 60*a* for opening the opening and closing member 36 of the upper cultivation shelf 30*a* and a lower driving device 60*b* for opening the opening and closing member 36 of the lower cultivation shelf 30*b*.

The driving device 60 may be configured to rotate the opening and closing member 36 by pressing the rotation manipulation portion 362 of the opening and closing member 36.

In detail, the driving device 60 may include a case 61 forming an outer appearance, a driving motor 62 provided inside the case 61, a pinion 63 mounted on a rotational shaft of the driving motor 62, a bracket 64 supporting the pinion 63, and a rod that moves up and down inside the case 61 and is in contact with the rotation manipulation portion 362.

Figure 15:
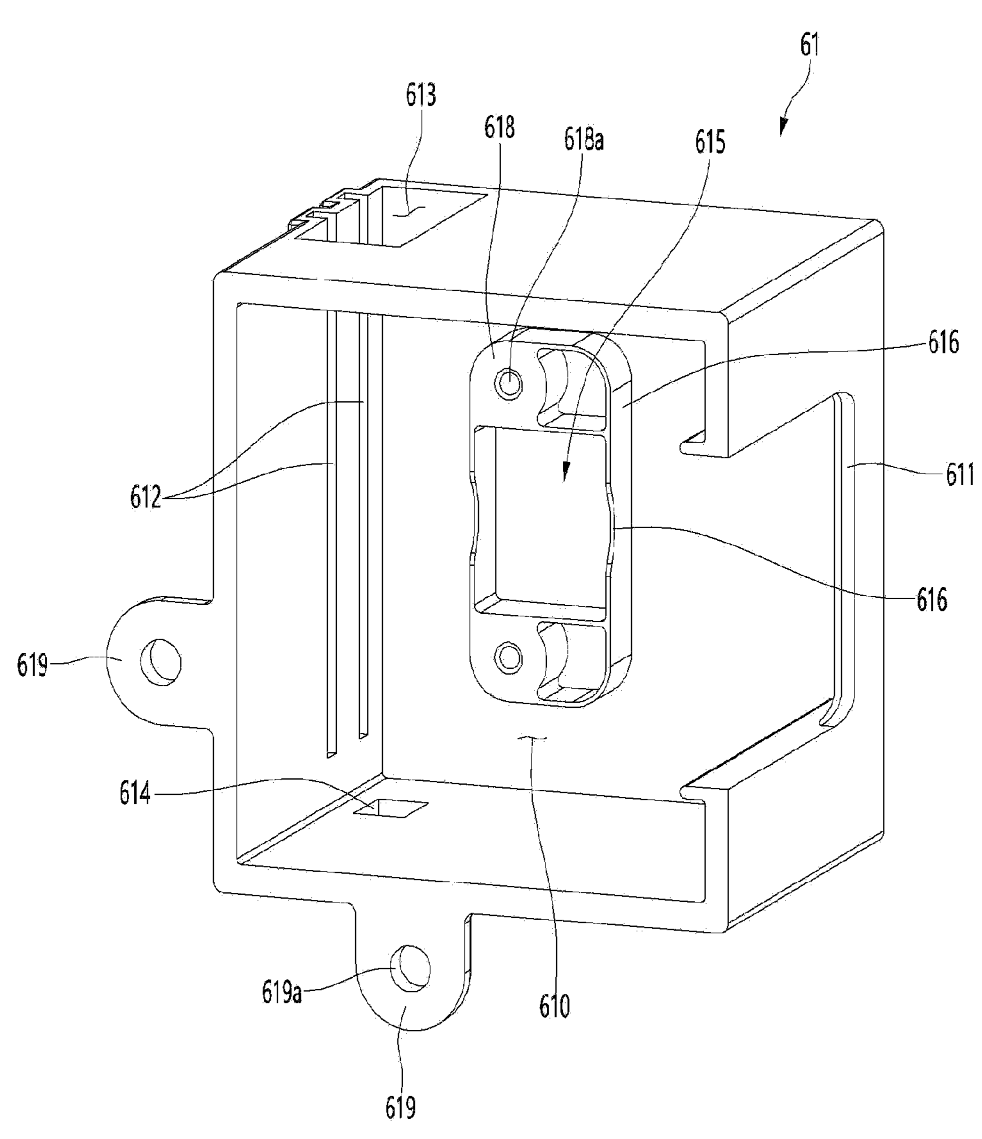
FIG. 15 is a perspective view illustrating a case structure of the driving device.

FIG. 15 is a perspective view illustrating a case structure of the driving device.

As illustrated in the drawing, the case 61 may be formed in a box shape with an open rear surface. In addition, the case 61 forms an accommodation space 610 accommodating the driving motor 62, the pinion 63, and the rod 65 therein.

In addition, the case 61 includes a side cutout 611 formed by opening a portion of the side on which the driving motor 62 is mounted. In addition, the side cutout 611 may be formed in a shape in which one side corner is rounded. The side cutout 611 provides a space through which an electric wire connecting the driving motor 62 can be drawn. In addition, in a state where the driving motor 62 and the pinion 63 are temporarily assembled, when the pinion 63 and the rod 65 are coupled, in a case where the side of the case 61 is shielded, assembling between respective components due to structural interference may not be easy. The side cutout 611 has the advantage of additionally securing a working space when the driving motor 62, the pinion 63, the rod and the like are inserted and mounted into the case 61. Therefore, the side cutout 611 can increase work convenience when assembling the driving device 60.

Meanwhile, the case 61 has a guide 612 for guiding the movement of the rod 65 is formed on one side. The guide 612 is formed at a position facing the side cutout 611 among both sides of the case 61.

The guide 612 may be formed to extend vertically along the side surface of the case 61. A plurality of guides 612 corresponding to the number of guide ribs 654 protruding from one side of the rod 65 may be formed in the case 61.

The guide 612 is recessed on the inner surface of the case 61 so that the guide rib 654 can be accommodated therein. In addition, the guide rib 654 may be recessed by a length protruding from the rod 65 so that the rod 65 can be stably mounted on the case 61. Accordingly, the guide 612 may protrude in an outward direction (away from the accommodation space) from one side of the case 61.

In addition, the guide 612 may be formed to extend from an upper end of the case 61. In other words, an upper surface of the guide 612 is partially opened and includes a rod insertion portion 613 into which the rod 65 is inserted. The guide 612 may be connected to the rod insertion portion 613.

The rod insertion portion 613 may be formed at a position corresponding to a position where the rod 65 is mounted on the case 61. In addition, the rod insertion portion 613 may be formed to have a size corresponding to the size of the upper surface of the body 651 of the rod 65.

The rod insertion portion 613 allows the rod 65 to be inserted downwardly from the upper portion of the case 61 to be mounted inside the case 61. In addition, the rod insertion portion 613 allows the rod 65 to pass through the case 61 and move vertically.

A through-portion 614 with a portion opened is formed on the lower surface of the case 61 so that the pressing portion 653 of the rod 65 can pass therethrough. The through-portion 614 is formed to have a size smaller than that of the rod insertion portion 613.

The through-portion 614 may be formed in a size corresponding to that of the lower surface of the pressing portion 653. In addition, the through-portion 614 may be smaller than the size of the lower surface of the body 651 of the rod 65. Accordingly, the through-portion 614 allows only the pressing portion 653 to pass through the lower surface of the case 61 when the rod 65 moves in the vertical direction. In addition, the body 651 of the rod 65 is prevented from penetrating downward through the case 61 by the through-portion 614.

With this structure, the pressing portion 653 can press the rotation manipulation portion 362 of the opening and closing member 36 by a set depth from above. The length of the pressing portion 653 and the downward moving length of the rod 65 may be set to such an extent that the drain hole **319*a* can be sufficiently opened by rotating the opening and closing member 36**.

The case 61 is formed with a mounting portion 615 to which a bracket 64 supporting the pinion 63 is mounted. The mounting portion 615 may be formed at a position corresponding to a position inserted into the bracket 64 on the front surface of the case 61. In addition, the mounting portion 615 may be formed spaced apart from the guide 612 at a set interval so as not to interfere with the vertical movement path of the rod 65.

The mounting portion 615 may protrude from the inside of the front surface of the case 61 to the rear. The mounting portion 615 includes an edge portion 616 protruding from the front surface of the case 61 and a boss 618 to which the bracket 64 is mounted.

In detail, both sides of the edge portion 616 may include rounded portions 617 providing a space in which the pinion 63 is mounted and rotates. A portion of the edge portion 616 of the rounded portion 617 may be depressed to support the pinion 63.

The rounded portion 617 may be formed at a position corresponding to a position where the pinion 63 is disposed in a state where the pinion 63 is mounted on the case 61. In addition, the rounded portion 617 may be formed in a shape in which one side of the edge portion 616 is rounded so as not to interfere with the rotation of the pinion 63.

The pinion 63 can be rotated by driving the driving motor 62 while being in contact with the rounded portion 617 in a state of being mounted on the bracket 64 and the mounting portion 615.

The boss 618 may be formed at a position corresponding to the mounting hole 642 formed in the bracket 64. The boss 618 may protrude from the inside of the front surface of the case 61 to the rear. The boss 618 may be located on one side of the space formed by the edge portion 616. In addition, the boss 618 may be formed at an upper end portion and a lower end portion of the mounting portion 615, respectively.

The boss 618 allows the bracket 64 and the case 61 to be mounted. The boss 618 includes a boss hole **618*a* for accommodating a fastening member penetrating the mounting hole 642**.

A fastening portion 619 through which a fastening member such as a screw penetrates may be formed on a rear surface of the case 61 so that the case 61 can be fixed to the inner case 61. The fastening portion 619 may protrude outward from one side end and the bottom of the rear surface of the case 61. In addition, the fastening portion 619 includes a fastening hole **619*a* through which the fastening member passes and can be fixed to the inner case 61**.

Meanwhile, the driving motor 62 may be disposed inside the case 61, and a portion of the driving motor 62 may be configured to be exposed through the side cutout 611 of the case 61.

Figure 16:
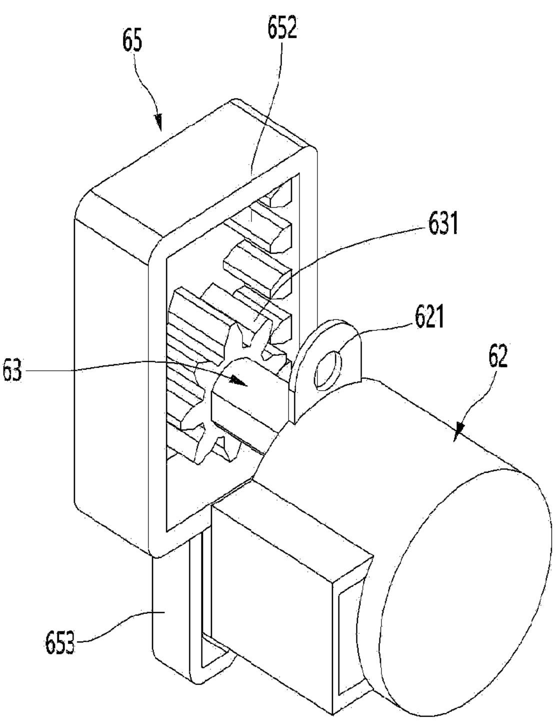
FIG. 16 is a perspective view illustrating the motor and rod of the driving device.
Figure 17:
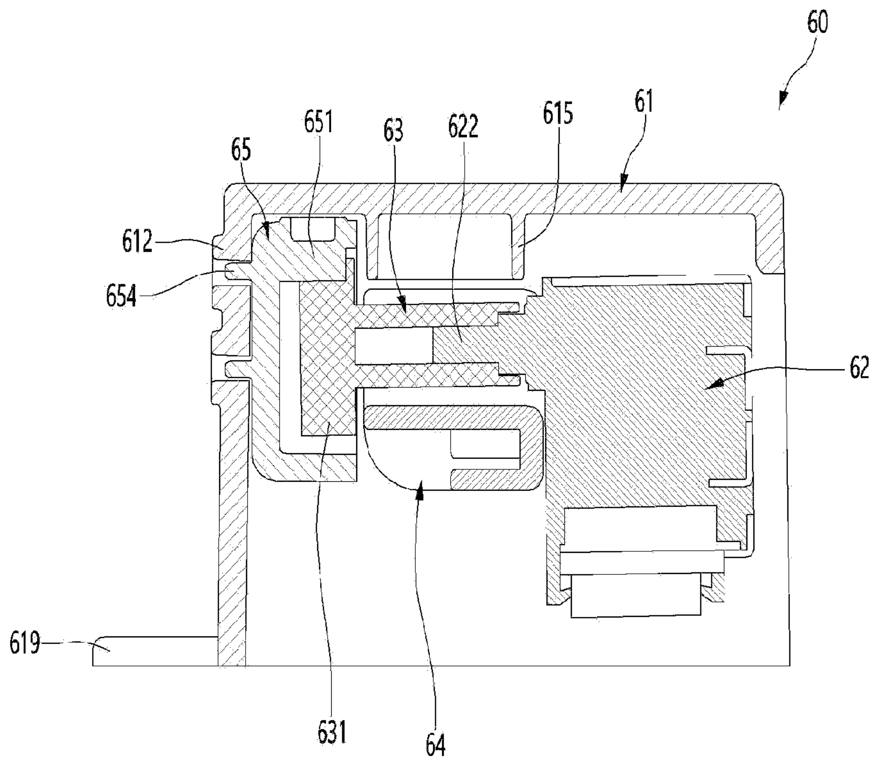
FIG. 17 is a cross-sectional view taken along line XVII-XVII' of FIG. 12.

FIG. 16 is a perspective view illustrating the motor and rod of the driving device, and FIG. 17 is a cross-sectional view taken along line XVII-XVII' of FIG. 12.

In addition, a motor fastening portion 621 for fixing the driving motor 62 to the bracket 64 may be formed in the driving motor 62. Accordingly, the driving motor 62 may be mounted in the motor fixing hole 644 formed in the bracket 64 by fastening a screw penetrating the motor fastening portion 621.

The driving motor 62 is disposed so that the rotation shaft 622 faces inward, and the pinion 63 may be coupled to the rotation shaft 622. A pinion gear 631 coupled to the rack gear 652 of the rod 65 may be formed at an end portion of the pinion 63.

In addition, a bracket 64 for supporting the pinion 63 may be provided in the case 61. One surface of the bracket 64 is coupled to the case 61, and a through-groove 641 through which the pinion 63 is disposed may be recessed on the surface coupled to the case 61. Accordingly, the pinion 63 is disposed on the bracket 64 so as to pass through the through-groove 641, and the bracket 64 maintains the correct mounting position of the pinion 63.

Mounting holes 642 are formed in the vertical direction of the through-groove 641. The mounting hole 642 is formed at a position corresponding to the boss hole **618*a* formed in the mounting portion 615 of the case 61. A screw passing through the mounting hole 642 may pass through the boss hole 618*a*, so that the bracket 64 may be fixedly mounted inside the case 61**.

A reinforcement portion 643 extending upward may be formed on the upper surface of the bracket 64. The reinforcement portion 643 may additionally provide an area in contact with the inner surface of the case 61 when the bracket 64 is mounted inside the case 61. Accordingly, in a state where the bracket 64 is fixed to the mounting portion 615, the reinforcement portion 643 is in contact with the inner surface of the case 61, so that the case 61 and the bracket 64 may be more firmly mounted.

In addition, a motor fixing hole 644 coupled to the driving motor 62 is formed on one surface of the bracket 64 coupled to the driving motor 62 by fastening a screw.

The motor fixing hole 644 is formed at a position corresponding to the motor fastening portion 619 formed in the driving motor 62, and the driving motor 62 can be mounted on the bracket 64 by a screw.

With this structure of the bracket 64, the pinion 63 is mounted in the through-groove 641 while being coupled with the rotational shaft 622 of the driving motor 62. In addition, the bracket 64 may be inserted into the case 61 and fixed to the mounting portion 615 in a state where the pinion 63 and the driving motor 62 are mounted.

Meanwhile, the rod 65 may be mounted so as to be vertically movable inside the case 61. The rod 65 passes through the rod insertion portion 613 formed on the upper surface of the case 61 and the through-portion 614 formed on the lower surface of the case 61, so that the rod 65 may move in the case 61 in the up and down direction.

The rod 65 includes a body 651 which may extend long in the vertical direction and is disposed inside the case 61, and a pressing portion 653 which extends downward from the lower end of the body 651 and is in contact with the opening and closing member 36.

The body 651 may be formed to have a cross-sectional area corresponding to the rod insertion portion 613 of the case 61 and may be guided by the guide 612 to move inside the case 61 in a vertical direction.

In addition, a rack gear 652 is formed on one surface of the body 651. The rack gear 652 is formed along one side of the body 651 facing the pinion gear 631.

The rack gear 652 may be formed to mesh with the pinion gear 631 in a state where the rod 65 is mounted on the case 61. Therefore, the rod 65 can be moved in the vertical direction by the pinion 63 that is rotated when the driving motor 62 is driven.

In addition, a guide rib 654 is formed on one surface of the body 651. The guide ribs 654 are formed to extend along the upper and lower directions of the body 651. In addition, the guide rib 654 may protrude outward from the body 651 and may be formed in a shape matched with the guide 612.

When the rod 65 is inserted into the case 61, the guide rib 654 is inserted into the guide 612 to guide the mounting position of the rod 65. In addition, the guide rib 654 allows the rod 65 to guide a path in which the rod 65 moves in the vertical direction.

In addition, the pressing portion 653 may be formed to have a smaller cross-sectional area than the cross-sectional area of the body 651. The pressing portion 653 may be formed to press the rotation manipulation portion 362 of the opening and closing member 36 from above when the rod 65 moves downward.

The vertical length of the pressing portion 653 and the downward moving stroke of the rod 65 may be set to such an extent that the drain hole 319*a* can be sufficiently opened by rotating the opening and closing member 36.

In addition, after the user draws out the cultivation shelf 30, the cultivation shelf 30 is inserted less than a set interval without being completely inserted, and drainage may proceed. The rod 65 may have a vertical length and a moving radius sufficient to sufficiently open the drain hole 319*a* by the rotation of the opening and closing member 36 even when drainage proceeds in a state where the cultivation shelf 30 is less inserted.

With this structure, the rod 65 can be moved downward by a set distance when the driving device 60 is operated to drain the cultivation shelf 30, and press the rotation manipulation portion 362 to rotate the opening and closing member 36. In addition, the drain hole 319*a* is opened by rotation of the opening and closing member 36 to drain water from the cultivation shelf 30.

In addition, in a case where drainage of the cultivation shelf 30 is not performed, the driving device 60 is not operated, and at this time, the rod 65 may be located inside the case 61 or the lower end of the lower rod 65 may be located at the lower end of the case 61. Therefore, it is possible to prevent the rod 65 from being exposed to the outside and from interfering with components inside the cultivation space 100.

Hereinafter, the operating state of the driving device 60 and the opening and closing member 36 will be examined in more detail with reference to the drawings.

Figure 18:
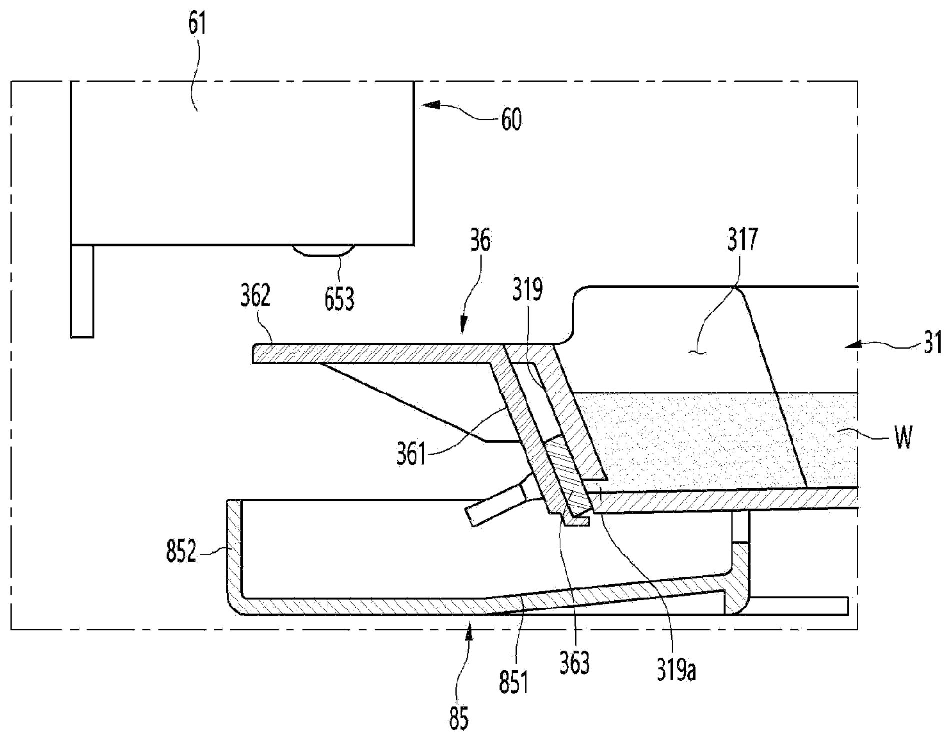
FIG. 18 is a view illustrating a state where the opening and closing member is closed before operation of the driving device.

FIG. 18 is a view illustrating a state where the opening and closing member is closed before operation of the driving device.

As illustrated in the drawing, the cultivation shelf 30 may be supplied with a set amount of water inside the water tank 70 to the cultivation shelf 30 through the water supply pipe 84 by driving the pump 83.

While water is supplied to the cultivation shelf 30 and after water supply is completed, the driving device 60 is not operated until drainage is started. In addition, the opening and closing member 36 also maintains a state where the drain hole 319*a* is shielded. Therefore, the cultivation shelf 30 is kept in a state of being filled with water, and a required amount of water can be absorbed by the seed package 90.

In an initial state where the driving device 60 is not operated, most of the rod 65 may be located inside the case 61. Accordingly, when viewed from the front, the driving device 60 and the rod 65 may be substantially not exposed as the driving device 60 and the rod 65 are covered by the blower 50.

In a state where the opening and closing member 36 is closed, an inner surface of the opening and closing member 36 may be in a state where the shelf drain holed wall 319 is surrounded around and accommodated.

At this time, the sealing member 363 may press and be in close contact with the outer surface of the shelf drain holed wall 319 to shield the drain hole 319*a*.

Therefore, the water supplied to the inside of the cultivation shelf 30 is not drained to the drain tray 85 in a normal water supply situation, and the drain tray 85 may remain empty.

Figure 19:
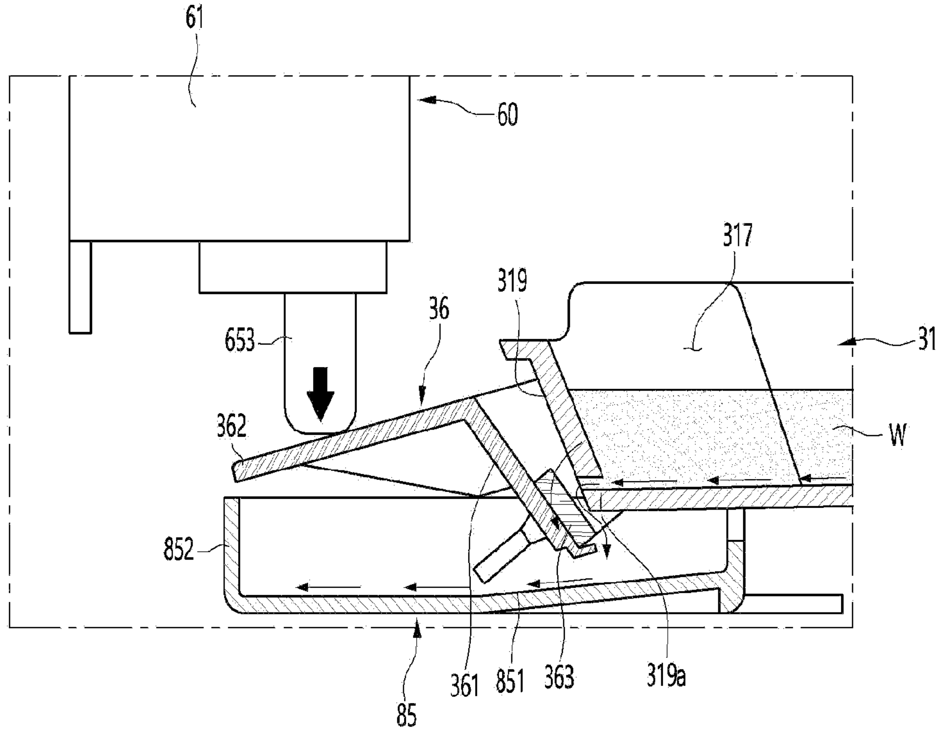
FIG. 19 is a view illustrating a state where the opening and closing member is opened by the operation of the driving device.

FIG. 19 is a view illustrating a state where the opening and closing member is opened by the operation of the driving device.

As illustrated, when a set time passes in a state where water is supplied to the cultivation shelf 30, the water inside the cultivation shelf 30 may be drained.

In order to drain water from the cultivation shelf 30, the driving device 60 is operated first. In detail, the pinion 63 is rotated by the forward rotation of the driving motor 62, and the rod 65 coupled with the pinion 63 may be moved downward.

At this time, the rod 65 is located vertically above the rotation manipulation portion 362 of the opening and closing member 36, and when the rod 65 continuously moves downward, the rotation manipulation portion 362 is pressed to rotate the opening and closing member 36.

The rod 65 is lowered to a height at which the opening and closing member 36 may be rotated to sufficiently open the drain hole 319*a*. When the rod 65 descends to a set height, the driving motor 62 stops rotating.

When the rotation manipulation portion 362 is pressed due to the lowering of the rod 65, the opening and closing member 36 rotates based on the rotation shaft 319*b* of the opening and closing member. The opening and closing member 36 is rotated counterclockwise (as seen in FIG. 19), and when the opening and closing member 36 rotates by a set angle or more, the sealing member 363 opens the drain hole 319*a*.

The set angle may be, for example, 4 degrees or more, preferably 9 degrees or more. In other words, the rotation manipulation portion 362 may be pressed by the rod 65 and rotated at an angle of at least 6 degrees in a counterclockwise direction (as seen in FIG. 19).

If the rotation manipulation portion 362 rotates by the set angle or less, the drain hole 319*a* is not completely opened, and thus water may leak to a place other than the drain hole 319*a*.

In addition, when the rotation manipulation portion 362 is rotated at an angle of at least 9 degrees or more even if drainage starts in a state where the cultivation shelf 30 is not completely drawn in due to a user's mistake, the drain hole 319*a* can be sufficiently opened. Accordingly, it is possible to prevent leakage of water to a place other than the drain hole 319*a* due to the opening and closing member 36 incompletely opening the drain hole 319*a*.

When the drain hole 319*a* is opened by the rotation of the opening and closing member 36, water inside the cultivation shelf 30 may be drained through the drain hole 319*a* and fall into the inside of the drain tray 85.

In addition, the water falling into the drain tray 85 may flow along the bottom surface 851 of the drain tray, go to a tray drain provided near a rear surface 852 of the drain tray, and flow into the drain pipe 89.

Meanwhile, when the water contained in the cultivation shelf 30 is discharged, the driving motor 62 rotates in reverse, and the rod 65 moves upward to return to an initial state. At this time, the opening and closing member 36 rotates clockwise to be closed again, so that water can be supplied to the cultivation shelf 30.

This process of water supply and drainage can be repeated at set time intervals, and an appropriate amount of water can be supplied to the plants cultivated on the cultivation shelf 30 in a timely manner.

INDUSTRIAL APPLICABILITY

The plant cultivation apparatus according to an embodiment of the present disclosure can maintain a clean environment by emptying the water inside the cultivation shelf except when water is supplied to the cultivation shelf, and thus has high industrial applicability.

The invention claimed is:

1. A plant cultivation apparatus comprising:
a cabinet which defines a growing space;
a cultivation shelf provided in the growing space and on which one or more plants for cultivation are seated, the cultivation shelf including a drain hole configured to drain water supplied to the cultivation shelf;
a cover configured to open and close the drain hole; and
a driving device configured to open and close the cover,
wherein the driving device includes:
a driving motor;
a pinion rotated by the driving motor and having a pinion gear;
a rod having a rack gear coupled to the pinion gear and configured to be moved up and down by the pinion to open and close the cover; and
a case configured to form an outer appearance of the driving device and to guide a movement of the rod, and
wherein the rod is configured to move downward to press the cover and thereby open the drain hole, and to move upward to release contact with the cover and whereby the drain hole is closed by the cover.

2. The plant cultivation apparatus of claim 1,
wherein the case includes:
an inner surface including a recess that defines a guide extending in a vertical direction to guide the movement of the rod.

3. The plant cultivation apparatus of claim 1,
wherein an upper surface of the case includes a rod insertion opening through which the rod passes.

4. The plant cultivation apparatus of claim 1,
wherein a lower surface of the case includes a through-opening through which the rod passes.

5. The plant cultivation apparatus of claim 1,
wherein the driving device further includes a bracket having a recessed side that supports the pinion.

6. The plant cultivation apparatus of claim 5,
wherein the case includes a mounting extension which protrudes from an inner surface of the case and to which the bracket is mounted.

7. The plant cultivation apparatus of claim 6,
wherein the mounting extension includes a boss into which a fastener penetrating the bracket is inserted.

8. The plant cultivation apparatus of claim 6,
wherein the mounting extension includes an edge wall protruding from the inner surface of the case, and a rounded wall formed in a rounded shape on one side of the edge wall and in contact with the pinion.

9. The plant cultivation apparatus of claim 6,
wherein the recessed side of the bracket includes a through-groove through which the pinion passes.

10. The plant cultivation apparatus of claim 9,
wherein the bracket includes a mounting hole which is disposed above or below the through-groove, and through which a fastener passes to be coupled to the mounting extension.

11. The plant cultivation apparatus of claim 5,
wherein the bracket includes a reinforcement wall extending upward from an upper surface of the bracket.

12. The plant cultivation apparatus of claim 5,
wherein one side of the bracket is coupled to the driving motor and includes a motor fixing hole through which a fastener passes through and is coupled to the driving motor.

13. The plant cultivation apparatus of claim 1,
wherein a side surface of the case includes a side cutout.

14. The plant cultivation apparatus of claim 1,
wherein the case includes a fastening extension protruding from a surface of the case and having a fastening hole through which a fastener passes.

15. The plant cultivation apparatus of claim 1,
wherein the rod includes:
a body in which the rack gear is formed; and
a pressing protrusion extending downward from a lower end of the body and in contact with the cover.

16. The plant cultivation apparatus of claim 15, wherein a lower surface of the body is larger than a lower surface of the pressing portion.

17. The plant cultivation apparatus of claim 15, wherein the body includes a guide rib protruding from a surface of the body and extending in a vertical direction.

18. The plant cultivation apparatus of claim 1, wherein the driving device is provided above the cultivation shelf and at the rear of the cultivation space.

19. The plant cultivation apparatus of claim 1, wherein the cover includes:

a first wall extending in a first direction;

a second wall extending from an end of the first wall in a second direction that differs from the first direction; and a seal provided on the second wall and facing the drain hole, and wherein the cover is hingedly connected to the cultivation shelf, and wherein the first wall is configured to be moved by the rod such that the seal is moved relative to the drain hole.

20. A plant cultivation apparatus comprising:

a cabinet which defines a growing space;

a tray provided in the growing space and on which one or more plants are received, the tray including a drain hole and a rotation shaft;

a cover including a wall facing the drain hole, and an opening to receive the rotational shaft such that the cover is rotatably connected to the tray;

a motor;

a protrusion moved by the motor and including a distal end that contacts and moves the cover to open and close the drain hole; and a case that receives the motor and guides movement of the protrusion, wherein the protrusion is configured to move downward to press the cover and thereby open the drain hole, and to move upward to release contact with the cover and whereby the drain hole is closed by the cover.

* * * * *